US009370705B2

(12) United States Patent
Grzesiak et al.

(10) Patent No.: US 9,370,705 B2
(45) Date of Patent: Jun. 21, 2016

(54) PROPRIOCEPTIVE SHOE ATTACHMENT AND METHOD OF USE

(71) Applicants: Andrew J. Grzesiak, Ann Arbor, MI (US); Melissa Grzesiak, Ann Arbor, MI (US)

(72) Inventors: Andrew J. Grzesiak, Ann Arbor, MI (US); Melissa Grzesiak, Ann Arbor, MI (US)

(*) Notice: Subject to any disclaimer, the term of this patent is extended or adjusted under 35 U.S.C. 154(b) by 470 days.

(21) Appl. No.: 13/848,474

(22) Filed: Mar. 21, 2013

(65) Prior Publication Data

US 2013/0252217 A1    Sep. 26, 2013

Related U.S. Application Data

(60) Provisional application No. 61/614,896, filed on Mar. 23, 2012.

(51) Int. Cl.
| | |
|---|---|
| *A63B 21/00* | (2006.01) |
| *A63B 71/00* | (2006.01) |
| *A63B 26/00* | (2006.01) |
| *A63B 21/068* | (2006.01) |
| *A63B 22/16* | (2006.01) |
| *A63B 23/035* | (2006.01) |
| *A63B 22/00* | (2006.01) |
| *A63B 22/18* | (2006.01) |

(52) U.S. Cl.
CPC ............... *A63B 71/00* (2013.01); *A63B 21/068* (2013.01); *A63B 21/4015* (2015.10); *A63B 22/16* (2013.01); *A63B 23/03541* (2013.01); *A63B 26/003* (2013.01); *A63B 2022/0092* (2013.01); *A63B 2022/185* (2013.01); *A63B 2208/0204* (2013.01); *A63B 2208/0209* (2013.01); *A63B 2209/00* (2013.01); *A63B 2225/62* (2013.01)

(58) Field of Classification Search
USPC .................................................. 482/76, 75, 77
See application file for complete search history.

(56) References Cited

U.S. PATENT DOCUMENTS

| | | | |
|---|---|---|---|
| 1,021,142 A | 3/1912 | Freeman | |
| 2,756,517 A | 7/1956 | Youtz | |
| 4,132,404 A * | 1/1979 | Wilson | .......................... 482/132 |
| D448,920 S | 10/2001 | Montross et al. | |
| 6,551,225 B1 | 4/2003 | Romero | |
| 6,979,282 B1 * | 12/2005 | Mangano | ........................ 482/51 |
| 7,194,781 B1 | 3/2007 | Orjela | |
| 7,500,324 B1 | 3/2009 | Power et al. | |
| 7,744,513 B2 | 6/2010 | Castellano | |
| 8,038,583 B2 | 10/2011 | Bailar | |
| 2010/0126514 A1 | 5/2010 | Castellano | |
| 2010/0251565 A1 | 10/2010 | Litchfield et al. | |
| 2010/0251567 A1 | 10/2010 | McInnis et al. | |
| 2011/0148062 A1 * | 6/2011 | Reyes, Jr. | ................. 280/87.042 |
| 2012/0005921 A1 * | 1/2012 | Diepenbrock | .................... 36/28 |
| 2013/0178346 A1 * | 7/2013 | Lin | ............................... 482/146 |

* cited by examiner

*Primary Examiner* — Jerome w Donnelly
(74) *Attorney, Agent, or Firm* — Robert L. Stearns; Dickinson Wright, PLLC (57) ABSTRACT

A proprioceptive device for improving proprioceptive balance in a person is provided. The proprioceptive device includes an elastic band which is expandable for releasably engaging and fitting snugly around a shoe. The proprioceptive device also includes a pair of instability inducing proprioception features which are carried by the band. The proprioceptive features are spaced from one another in a longitudinal direction for inducing lateral and longitudinal instability while allowing the person to walk with a heel to toe gait.

17 Claims, 8 Drawing Sheets

PROPRIOCEPTIVE SHOE ATTACHMENT AND METHOD OF USE

BACKGROUND OF THE INVENTION

1. Field of the Invention

This invention relates generally to proprioceptive training devices.

2. Related Art

Proprioception is the sense of the orientation of one's limbs in space that comes from the body's central nervous system (i.e., the body's ability to know where everything is). When learning a new skill, such as throwing a baseball, riding a bike or even walking, it is necessary for one's body to become familiar with the proprioceptive tasks that are specific to the particular activity. One's proprioceptive sense can diminish with age, disease, illness or inactivity but may be regained or improved with appropriate therapy. Athletes and other active persons that engage in various physical activities (e.g., football, basketball, skiing, etc.) can sharpen their proprioceptive senses associated with the particular activity through appropriate proprioceptive training in order to improve their performance and/or reduce chances of injury. Proprioceptive training also aims to improve balance and confidence and also to prevent falls in people with gait deviations and balance impairments.

Traditional devices used in proprioceptive therapy and training include a wobble board, a balance board and a BOSU® ball. Each of these devices is designed to move a user's body between various positions and challenge his or her proprioceptive senses. Other proprioceptive therapy techniques include standing or hopping on one foot and performing Yoga exercises.

While all of these techniques are helpful to improve one's proprioceptive senses, they do not necessarily translate directly to real life body movements that one might experience in everyday life or when performing challenging sports activities that involve where the body constantly changing directions terrain that is specific to the activity, such as playing football or soccer on an artificial turf. While standing on a wobble or balance board may be beneficial, such activities are static training exercises relative to an actual running-type activity since the persons legs are not in motion. Additionally, the surface of the wobble or balance board may not be representative of the terrain that one is training to perform on. These traditional devices do not provide a balance platform that is truly dynamic allowing the user to make functional translational movements while mimicking the normal heel-toe gait pattern seen with tasks such as running. Therefore, the ability of the user to transition between various activities without interruption is limited.

SUMMARY OF THE INVENTION

One aspect of the present invention provides for a proprioceptive shoe attachment device includes an elastic band which is expandable to fit snugly about the sole of a wearer's shoe and is flexible so as not to impair the normal fit, flexibility and feel of the shoe. The proprioceptive device also includes at least two vertically extending instability inducing features carried by the elastic band. When a pair of proprioceptive devices are attached to a person's shoes, they induce instability in a longitudinal direction and a lateral direction while still allowing the person to walk with a heel to toe gait. When wearing the proprioceptive devices on his or her shoes, the person's proprioceptive senses are challenged. This may be beneficial for therapy purposes (i.e., restoring a person's proprioceptive senses) or for enhancing already developed proprioceptive senses. The elastic bands allow the proprioceptive devices to be very quickly installed on or removed from a person's shoes with minimal effort.

BRIEF DESCRIPTION OF THE DRAWINGS

These and other features and advantages of the present invention will be readily appreciated as the same becomes better understood by reference to the following detailed description when considered in connection with the accompanying drawings, wherein.

DESCRIPTION OF THE ENABLING EMBODIMENT

Figure 1:
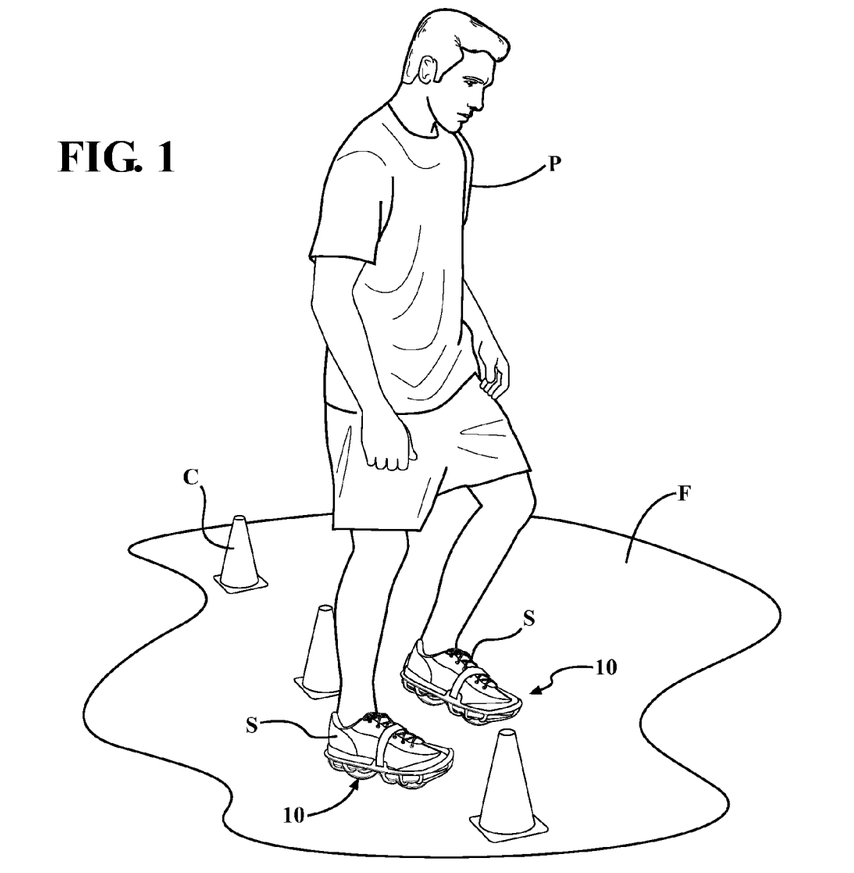
FIG. 1 is a perspective view of a user wearing shoes with proprioceptive devices attached thereto.

FIG. 1 illustrates a person P wearing a conventional pair of shoes S on his feet and maneuvering along a path around a series of cones C placed on the floor surface F. The floor surface F can be any of a variety of terrains, such hardwood flooring, concrete, carpeting, artificial turf, grass, etc. The shoes S may be any of a variety of different types of shoes, including running shoes, basketball shoes, soccer shoes, street shoes, turf shoes, etc. Attached to the sole of each shoe S is a proprioceptive device 10 that serves to alter the proprioceptive sense that the person P would otherwise have when walking or performing movements on the floor surface F. The purpose of the proprioceptive devices 10 is to introduce a certain, controlled instability (a somewhat imbalanced, wobbly feeling) that challenges the person's then-present proprioceptive sense relative to what would otherwise be experienced without the devices 10 attached to the shoes S. Through continued training with the proprioceptive devices 10, neuromuscular responses can be amplified to improve body awareness and sharpen a person's proprioceptive senses. Certain properties of the proprioceptive devices 10, such as shape and material, can be selected to provide more or less challenge to the person and/or to present a variety of different "terrains" to the person that are representative (or even exaggerated) of what the person may be training to perform on. For example, if the person is in rehabilitation and has difficulty walking on grass or on other non-flat, non-hard surfaces, then proprioceptive devices 10 that simulate or exaggerate that "grass" condition can be attached to that person's shoes 10. With the "grass-simulating" proprioceptive devices 10 attached to his or her shoes, the person P can walk across a flat, hard floor surface under the watch of an attending therapist/trainer and in a controlled environment while experiencing the instability and/or imbalance associated with walking on a grassy terrain. The proprioceptive devices 10 can also be used to improve the proprioceptive senses of an active person, such as a basketball player or a soccer player. For example, an athlete might attach certain proprioceptive devices 10 that are configured to sharpen balance to his or her shoes S and then walk, run, jump or perform other maneuvers associated with his or her sport. This may improve the person's performance and/or reduce their chances of injury while performing the activity without the aid of the proprioceptive devices 10. For example, if an athlete is prone to rolling ankles when performing the activity (e.g., basketball, volleyball, etc.), then training with the proprioceptive devices 10 may reduce the likelihood of ankle rolls while wearing their normal footwear with the proprioceptive devices 10 attached.

Aspects of the device 10 which are particularly notable and which will be more fully explained below include: 1) the ability to quickly but securely attach and detach the proprioceptive devices 10 from the shoes S of a person P; 2) the ability to select proprioceptive devices 10 having different shapes, sizes and properties to suit the particular person and condition that he or she wishes to simulate through use of the proprioceptive devices 10; and 3) the ability to impart proprioceptive imbalance to the person while moving (dynamic training) and particularly while walking or running in normal footwear and with a normal heel-to-toe gait movement of the person's legs and feet. As such, the person P can train while walking, running, jumping, and generally being active as he or she would be without the proprioceptive devices 10 being worn. This is in contrast to other known devices which require a user to remain generally immobile (e.g., standing on a ball or other static proprioceptive apparatus and exercises).

Referring now to FIGS. 2-6, a first exemplary embodiment of the proprioceptive device 10 is shown. Each device (they are typically used in pairs, with one attached to each shoe S) includes a pair of front and back proprioceptive features 12 that are collectively encircled by an elastomeric perimeter mounting band 14. The proprioceptive features 12 are attached to laterally opposite side portions 16, 18 of the band 14 by an associated plurality of elastomeric struts 20. The struts 20 are each attached at an inner end thereof to the associated proprioceptive feature 12 and extend radially outwardly in spaced, angular relation relative to one another to their opposite ends which are joined to the perimeter band 14 at its side portions 16, 18. The band 14 and struts 20 may be fabricated as a single piece from the same elastomeric material. Non-limiting examples of suitable elastomeric materials suitable for use in making the band 14 and struts 20 include rubber, silicone, and any other elastomeric materials that would enable the proprioceptive device 10 to be stretched and attached over the sole of a shoe S in the general manner illustrated in FIGS. 3 and 5 and described in greater detail below.

Figure 2:
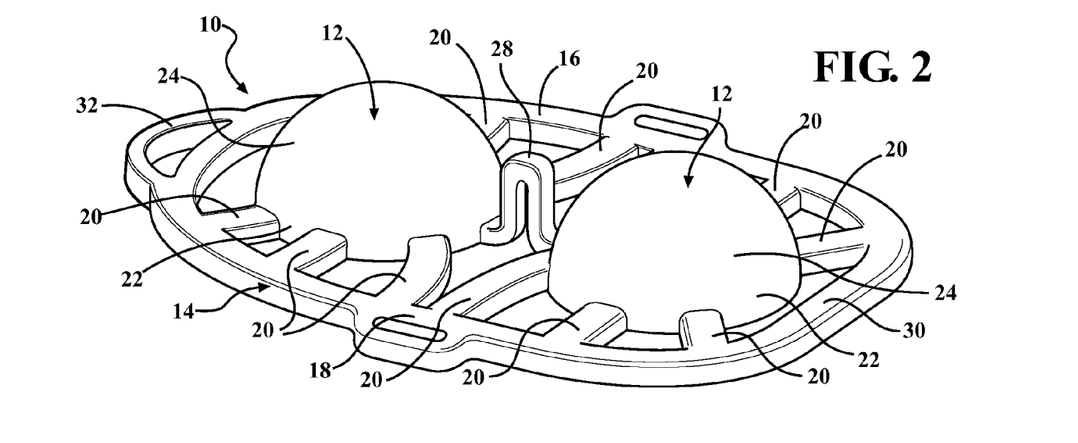
FIG. 2 is a bottom perspective view of a first exemplary embodiment of a proprioceptive device.

FIG. 2 illustrates the first exemplary embodiment of the proprioceptive device 10 in a relaxed condition (i.e., not attached to a shoe) and oriented upside-down relative to its position when mounted on a shoe S and in use (FIG. 1). As shown, in this relaxed condition, the perimeter mounting band 14 and the struts 20 are generally planar with one another. Referring to FIGS. 2, 3, 5 and 6, each of the proprioceptive features 12 has an upper base portion 22 that is joined to the struts 20 and a lower shaped portion 24 that projects below the upper base portion 22 and below the mounting band 14 and struts 20. When in use, the lower shaped portions 24 are the portions of the proprioceptive device 10 which make physical contact with the floor surface F (shown in FIG. 1) and impart the proprioceptive instability to the person P (shown in FIG. 1) wearing the proprioceptive device 10.

Figure 6:
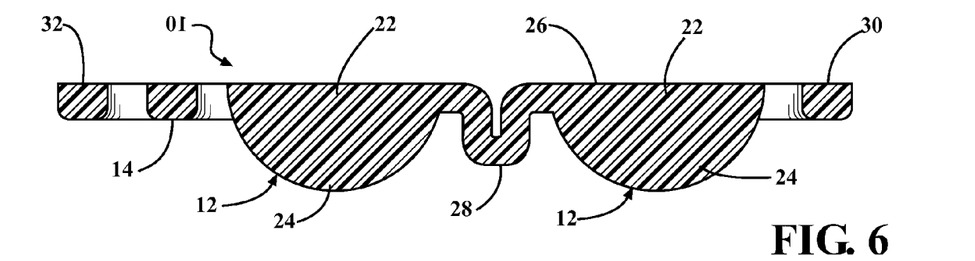
FIG. 6 is a cross-sectional view of a second exemplary embodiment of the proprioceptive device.

The proprioceptive features 12 may be fabricated entirely or partially of the same material and as a one-piece perimeter band 14 and/or the struts 20 or of a different material. As best shown in FIG. 6, each of the upper base portions 22 has a generally flat upper surface 26. When the proprioceptive device 10 is attached to a shoe, the upper surfaces 26 directly engage the bottom surface of the shoe. The proprioceptive features 12 are shaped similarly to one another and are illustrated as front and back features 12 and are spaced longitudinally from one another in the lengthwise direction of the first exemplary embodiment of the proprioceptive device 10, i.e. one of the features 12 is a front feature and the other is a back feature.

Figure 3:
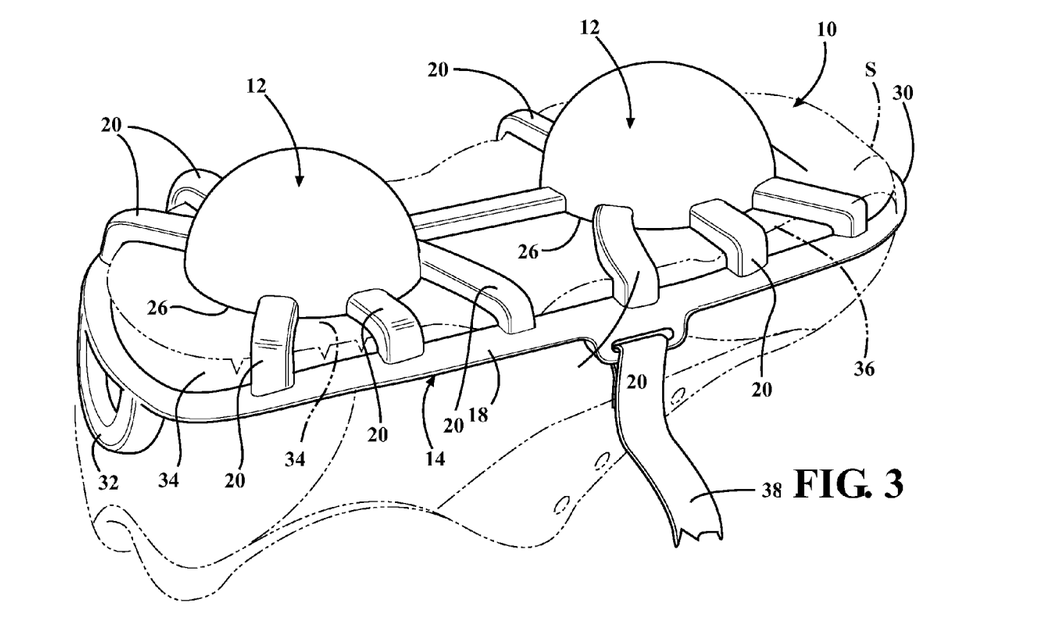
FIG. 3 is a bottom perspective view, like FIG. 2, but with the first exemplary embodiment of the proprioceptive device shown attached to the shoe.
Figures 4A, 4B, 4C:
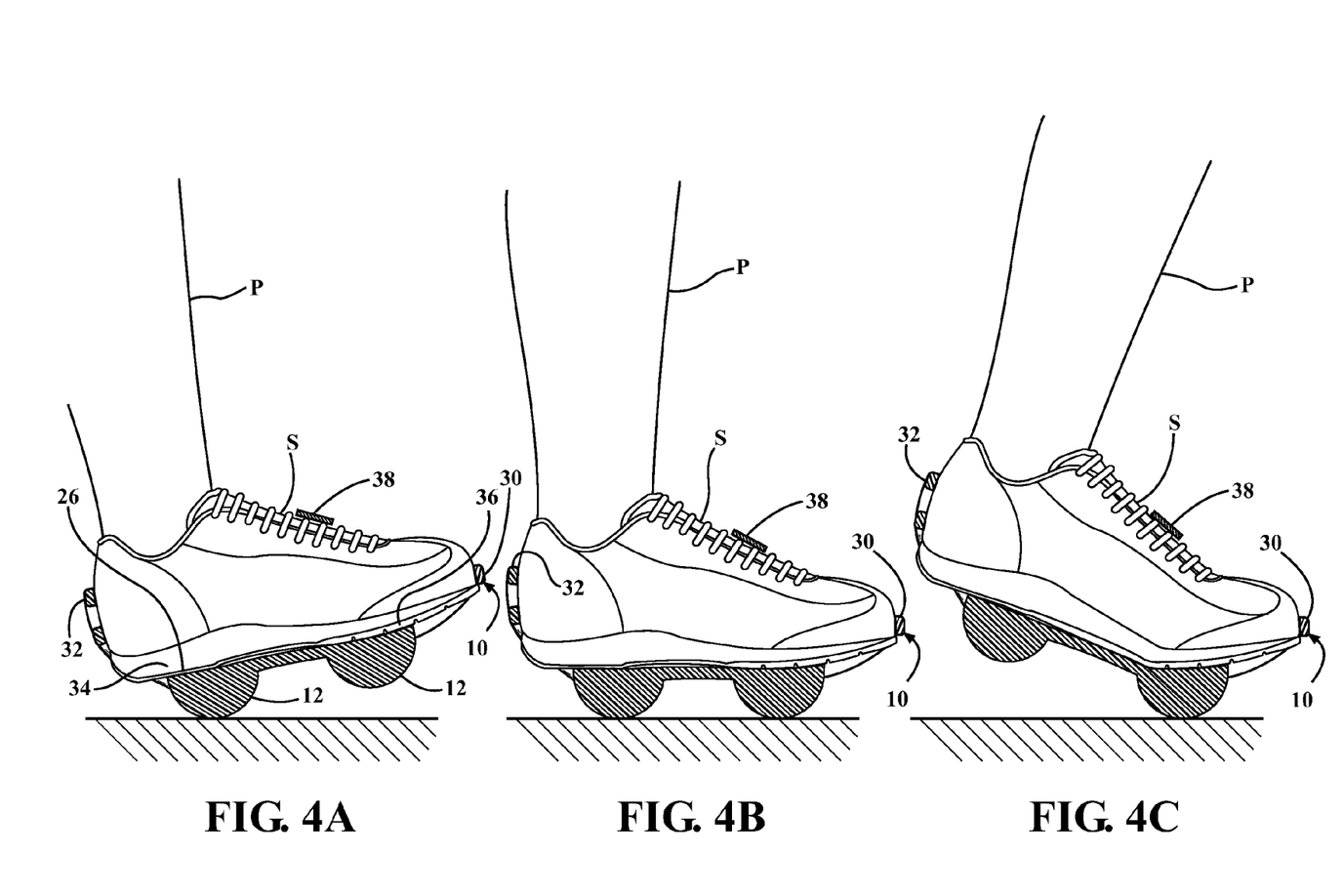
FIGS. 4a-4c are side elevation views, with the first exemplary embodiment of the proprioceptive device shown in section, showing sequential movement of the devices on a shoe through the normal heel-to-toe gait of walking.

As best shown in FIG. 6, when the proprioceptive device 10 is in the relaxed condition (not installed on a shoe), the front and back features 12 are spaced a first distance apart from one another. Referring now to FIG. 3, when the proprioceptive device 10 is installed on a shoe S, the elastic perimeter band 14 is stretched and the front and back features 12 are pulled apart so that they are spaced from one another by a second distance which is greater than the first distance. The front and back features 12 are arranged relative to one another and on the perimeter band 14 such that, when the device is attached to the shoe S, the front feature 12 is positioned at the ball region of the person's foot and the back feature 12 is positioned at the heel region of the person's foot. This arrangement facilitates walking with a normal heel-to-toe gait when wearing a pair of proprioceptive devices 10. In the first exemplary embodiment of the proprioceptive device 12, a bridge 28 of an elastic material extends between and interconnects the front and back features 12. The bridge 28 extends in generally parallel relationship with and is spaced laterally from the side portions 16, 18 of the perimeter band 14. The length of the bridge portion 28 is greater than the first distance between the front and back features 12 when in the relaxed (pre-installed condition). As such, as illustrated in FIG. 2, when the first exemplary embodiment of the proprioceptive device 10 is in the relaxed condition, the elastic bridge 28 has the form of a loop. Referring now to FIG. 3, when the first exemplary embodiment of the proprioceptive device 10 is installed on a shoe S, the elastic bridge 28 is stretched in the lengthwise or longitudinal direction, which draws the loop out of the bridge 28 and extends the bridge 28 even beyond its at rest length such that it is stretched taught and is under tension.

Figure 5:
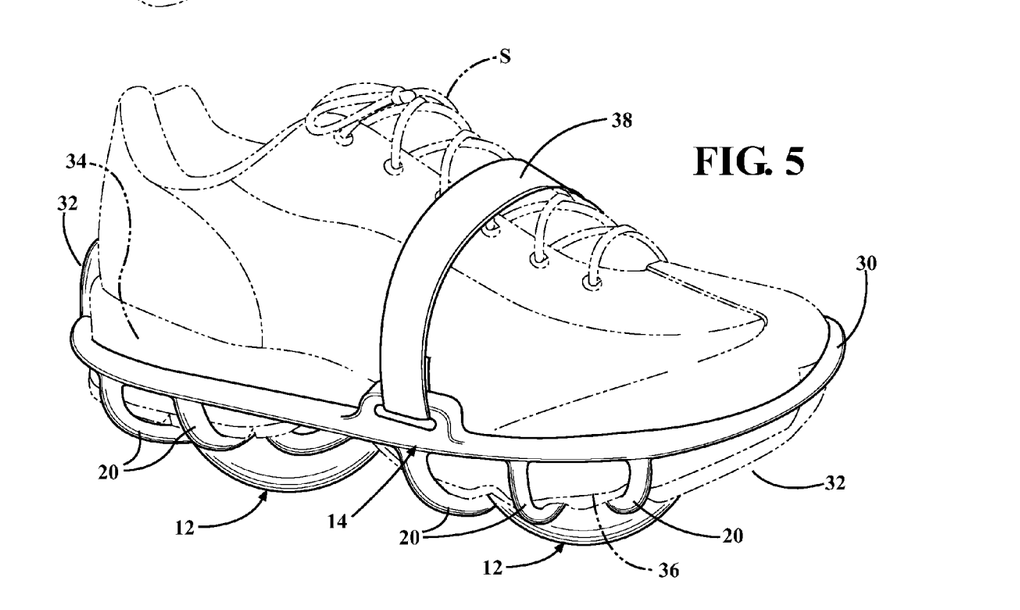
FIG. 5 is a top perspective view of the device attached to a shoe.

Referring back to FIG. 2 the perimeter band 14 of the first exemplary embodiment includes a front toe portion 30 on one longitudinal end and a back heel loop portion 32 on the opposite longitudinal end. As best shown in FIGS. 3 and 5, the proprioceptive device 10 is attached to a shoe S by looping the front toe portion 30 over the toe portion of the shoe S and then pulling the back heel loop portion 32 to stretch the perimeter band 14 and engage a back portion of the elastic perimeter band 14 against a back surface of the shoe S. Releasing the back heel loop portion 32 causes it to abut the back surface of the shoe S in a direction towards a person's Achilles tendon. As the device 10 is stretched, so is the bridge 28 between the front and back features 12. When fully installed, the perimeter band 14 is under constant tension and runs along the sides of the shoe sole to establish a connection between the proprioceptive device 10 and the shoe S. The bridge 28 keeps the features 12 from turning under the proprioceptive device 10 is in use, and the struts 12 retain the features 12 laterally. As such, the elasticity of the band 14, struts 20 and bridge 28, which are under constant tension when in the proprioceptive device 10 is attached to a shoe S keep the features 12 in their proper places and pressed against the bottom of the shoe S. A strap 38 is also engaged with apertures in the side portions 16, 18 of the perimeter band 14 and engaged against the top of the shoe to further secure the proprioceptive device 10 against the shoe S. The strap 38 may be of any suitable material and may have any suitable locking mechanism including, for example, a latch or Velcro. The proprioceptive device 10 is overall flexible and stretches and bends with the shoe S so that the user may walk with a heel-to-toe walking gait (FIG. 4) without the proprioceptive device 10 impairing the performance of the shoe S.

The lower shaped portion 24 of the features 12 may take on any of a number of shapes, sizes, constructions and materials that serve to impart an associated level of proprioceptive instability effect to the device when used. For example, in the first exemplary embodiment of FIGS. 2-6, the proprioceptive features 12 are generally hemi-spherically shaped. This provides a user with lateral instability (rolling side-to-side) as well as some level of fore-aft stability when a user walks with a heel-to-toe gait (FIG. 4). As shown in FIGS. 4 and 6, the features 12 on the first exemplary embodiment of the proprioceptive device are solid in cross section. The features 12 may be made of the same or a different material the struts 20 and/or base portions 22. The size and materials of the hemispherical features 12 may be selected to provide additional or less instability to the user.

FIGS. 7-19 illustrate various alternative exemplary embodiments of the proprioceptive device and including differently shaped features that may be used in place of one or both of the features 12 of the first exemplary embodiment described above and shown FIGS. 2-6. Differently shaped features may be used to train different proprioceptive senses in the person.

Figure 7:
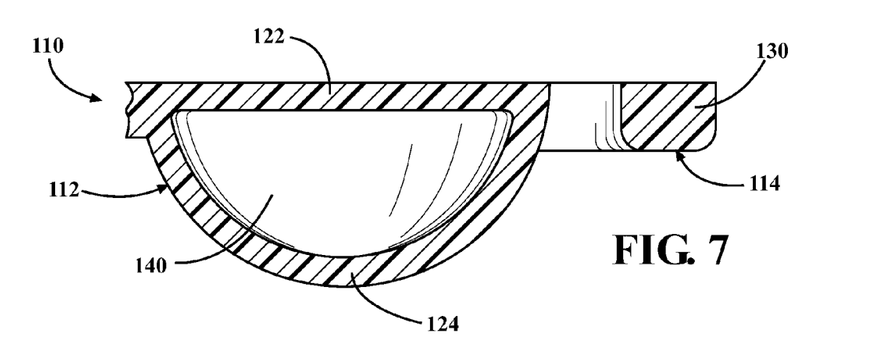
FIG. 7 is a cross-sectional and fragmentary view of a third exemplary embodiment of the proprioceptive device.

Referring now to FIG. 7, a second exemplary embodiment of the proprioceptive device 110 is generally shown with the same numerals, separated by a factor of 100, being used to identify features corresponding with those discussed above. In the second exemplary embodiment, the features 112 are hollow to present an air chamber 140. The air chamber 140 may provide the proprioceptive device 110 with a different proprioceptive effect than the first exemplary embodiment described above. The air chamber 140 may be pressurized to a specific pressure to provide the proprioceptive device 110 with a particular proprioceptive effect.

Figure 8:
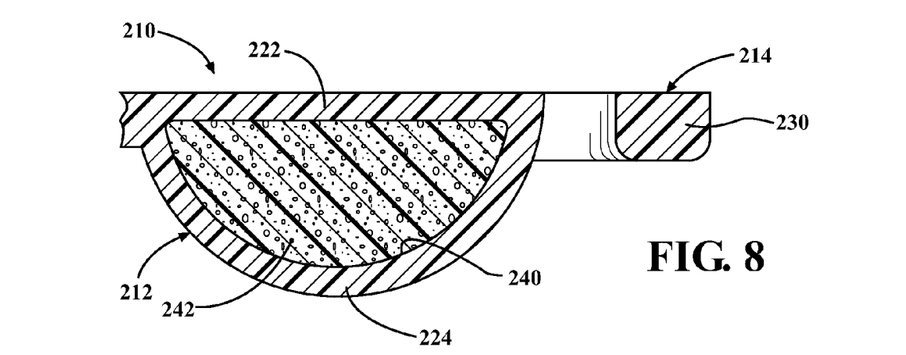
FIG. 8 is a cross-sectional and fragmentary view of a fourth exemplary embodiment of the proprioceptive device.

Referring now to FIG. 8, a third exemplary embodiment of the proprioceptive device 210 is generally shown with the same numerals, separated by a factor of 200, being used to identify features corresponding with those of the first exemplary embodiment discussed above. In this embodiment, each of the features 212 is made of two different materials. Specifically, the lower shaped portion 224 of each feature 212 includes a hollow space 240 that is at least partially filled with a second material 242. The second material 242 may be another rubber, another elastomeric material, gel, sand, beads, water, another fluid or any other material that is different than the material of the compressible or shearable material different than that of the first material of the lower shaped portion 224 to provide a particular proprioceptive effect.

Figure 9:
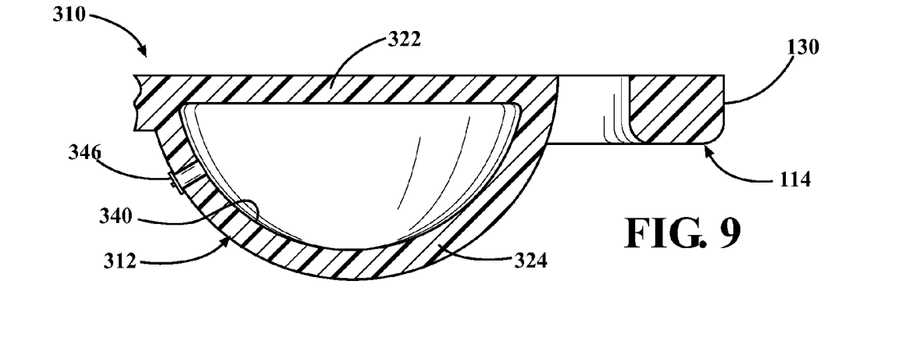
FIG. 9 is a cross-sectional and fragmentary view of a fifth exemplary embodiment of the proprioceptive device.

Referring now to FIG. 9, a fourth exemplary embodiment of the proprioceptive device 310 is generally shown with the same numerals, separated by a factor of 300, being used to identify features corresponding with those of the first exemplary embodiment discussed above. In this embodiment, the feature 312 is similar to the hollow feature 112 shown in FIG. 7 and discussed above but additionally includes an air valve 346 which is in fluid communication with the air chamber 340 and is configured to receive an external pump (not shown) and selectively inflate or deflate the air chamber 340 in a manner similar to inflating or deflating a basketball thereby adjusting the proprioceptive instability effect provided by the proprioceptive device 310. As such, the proprioceptive effect provided by this exemplary embodiment of the proprioceptive device 310 is adjustable.

Figure 10:
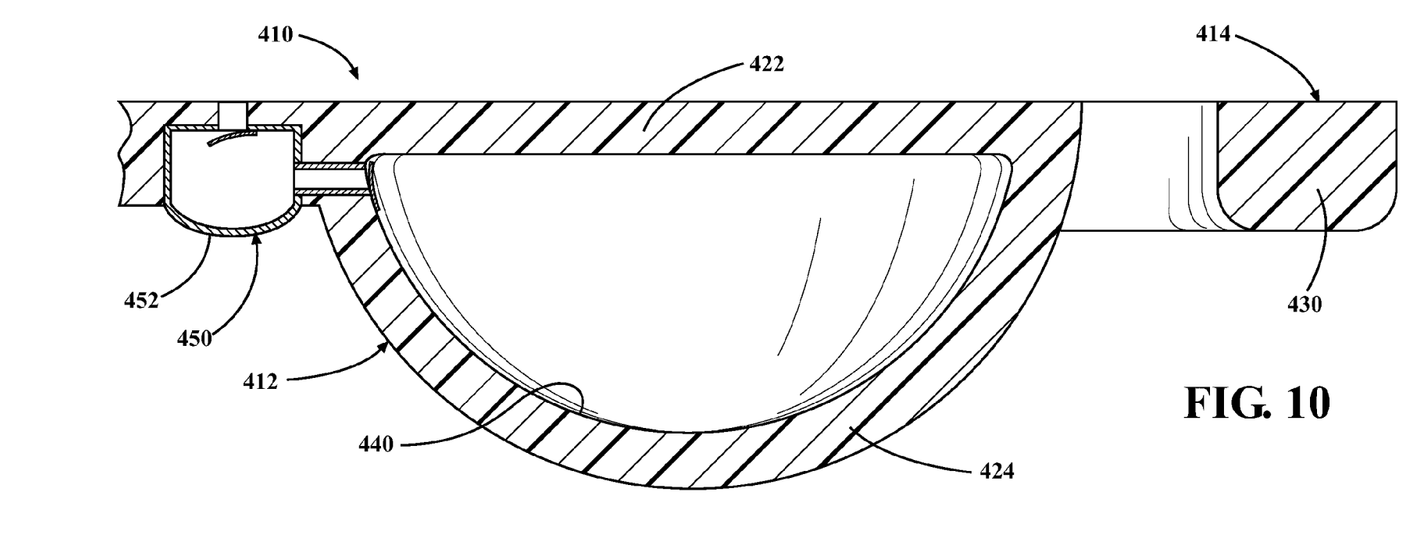
FIG. 10 is a cross-sectional and fragmentary view of a sixth exemplary embodiment of the proprioceptive device.

Referring now to FIG. 10, a fifth exemplary embodiment of the proprioceptive device 410 is generally shown with the same numerals, separated by a factor of 400, being used to identify features corresponding with those of the first exemplary embodiment discussed above. In this embodiment, the feature 412 is similar to the hollow feature 312 shown in FIG. 9 but includes a built-in air pump 450 rather than an air valve 346. The built-in air pump 450 has a deformable bulb 452 which may be compressed to pump air from outside of the proprioceptive device 410 into the air chamber 440. As such, similar to the exemplary embodiment shown in FIG. 9 and discussed above, the proprioceptive effect provided by this exemplary embodiment of the proprioceptive device 410 is adjustable.

Figure 11:
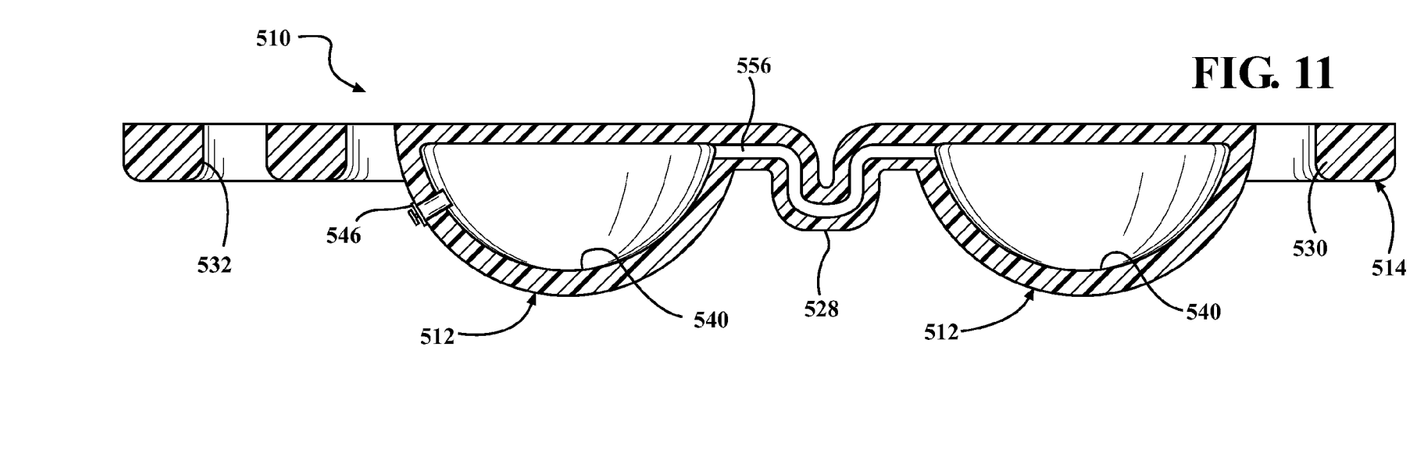
FIG. 11 is a cross-sectional view of a seventh exemplary embodiment of the proprioceptive device.

Referring now to FIG. 11, a sixth exemplary embodiment of the proprioceptive device 510 is generally shown with like numerals, separated by a factor of 500, being used to identify features corresponding with those of the first exemplary embodiment discussed above. In this embodiment, each of the features 512 is hollow to present an air chamber 540, and the air chambers 540 of the front and back features 512 are in fluid communication with one another. Specifically, an air passage 556 extends through the bridge 528 to fluidly connect the air chambers 540. In this embodiment, the bridge 528 may be formed of an elastic tubing, such as surgical tubing, so that it may stretch and retain its ability to provide air communication between the chambers 540 of the front and back features 512. During use, air (or any other fluid) in the chambers 540 may pass between the chambers 540 in response to external forces applied to the features 512. One of the features 512 also includes an air valve 546 for simultaneously selectively inflating and deflating the air chambers 540 to selectively adjust the proprioceptive effect provided by the proprioceptive device 510.

Figure 12:
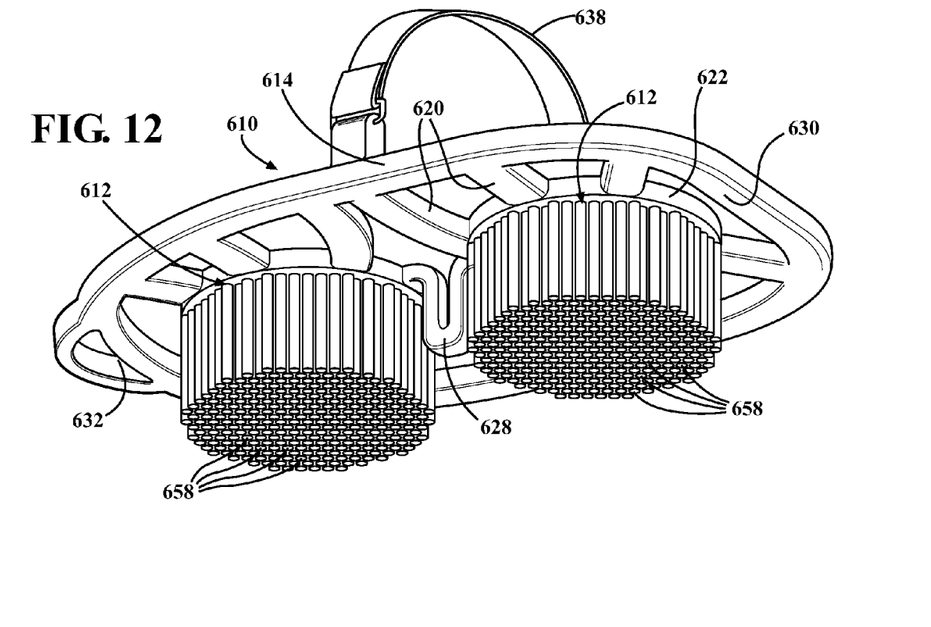
FIG. 12 is a bottom perspective view of an eighth exemplary embodiment of the proprioceptive device.
Figure 13:
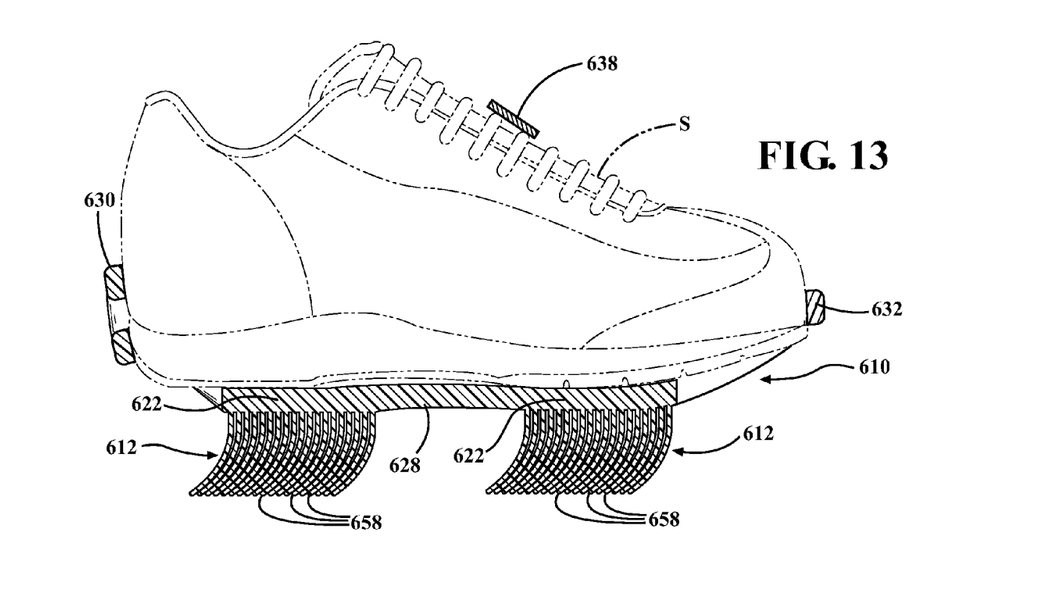
FIG. 13 is a side elevation view, with the eighth exemplary embodiment of the proprioceptive device shown in section, showing the proprioceptive device in engagement with a shoe.

FIGS. 12 and 13 illustrate a seventh exemplary embodiment of the proprioceptive device 610 with like numerals, separated by a factor of 600, being used to identify features corresponding with those of the first exemplary embodiment discussed above. In this embodiment, each feature 612 includes a plurality of strands 658 which extend vertically downwardly from the base portion 622. The strands 658 may be of the same or a different material from the base portion 622. The strands 658 may have similar or varying lengths. As shown in FIG. 13, when the proprioceptive device 610 is used, the strands 658, collapse thereby giving the effect of walking on a surface such as carpet or grass (depending upon the material of the strands 658. The strap 638 of this exemplary embodiment is configured differently than the above described embodiments and is connected with the elastic perimeter band 614 via a metal clip. However, it should be appreciated that the strap could have a range of different configurations.

Figure 14:
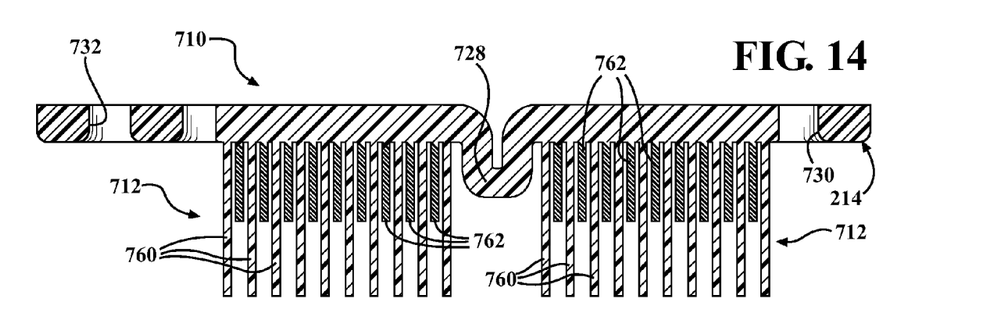
FIG. 14 is a cross-sectional view of a ninth exemplary embodiment of the proprioceptive device.

Referring now to FIG. 14, an eighth exemplary embodiment of the proprioceptive device 710 is generally shown with like numerals, separated by a factor of 700, being used to identify features corresponding with those of the first exemplary embodiment discussed above. In this embodiment, each of the features 712 includes a plurality of first strands 760 and a plurality of second strands 762, all of which extend vertically downwardly from the base portion 722. The first strands 760 are made of the same material as the base portion 722, and the second strands 762 are made of a different, stiffer material. The second strands 762 are also shorter than the first strands 760 and may have the effect of limiting the compressibility of the longer, more resilient first strands 760 to provide the proprioceptive device 710 with a particular proprioceptive effect.

Figure 15:
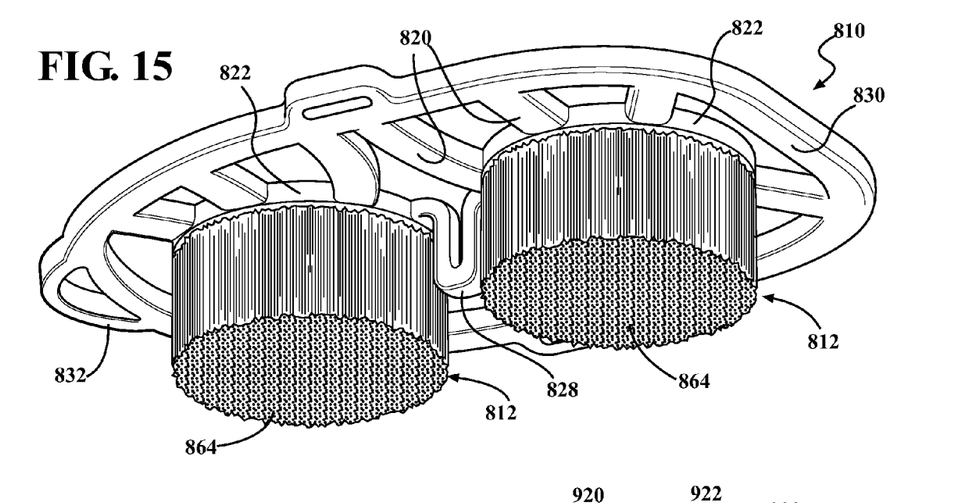
FIG. 15 is a bottom perspective view of a tenth exemplary embodiment of the proprioceptive device.

Referring now to FIG. 15, a ninth exemplary embodiment of the proprioception device is shown with like numerals, separated by a factor of 800, being used to identify features corresponding with those of the first exemplary embodiment discussed above. In this embodiment, each of the features 812 is a patch of artificial turf 864 that is bonded, for example with adhesives, to the base portion 822. This embodiment may be beneficial for training for a sport that participates on artificial turf. It should be appreciated that any suitable type of artificial turf material may be employed.

Figure 16:
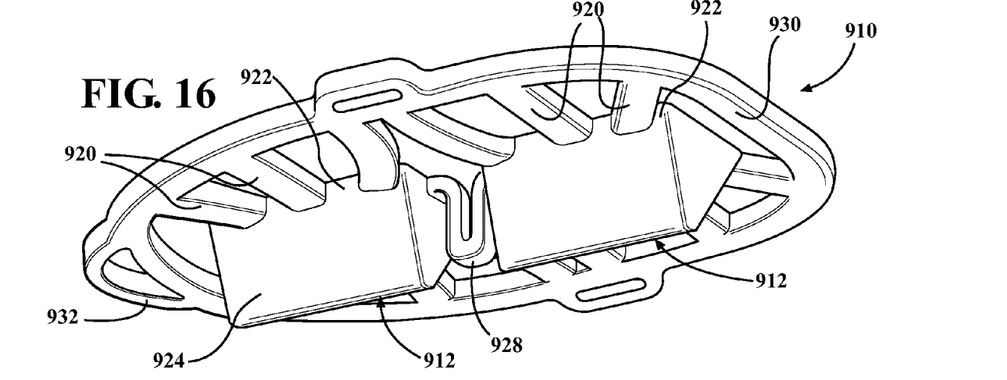
FIG. 16 is a bottom perspective view of an eleventh exemplary embodiment of the proprioceptive device.

Referring now to FIG. 16, a tenth exemplary embodiment of the proprioception device is shown with like numerals, separated by a factor of 900, being used to identify features corresponding with those of the first exemplary embodiment discussed above. In this embodiment, each of the features 912 has a wedge shape. The wedge-shaped features 912 may provide a user with a "balance beam" like instability with a high degree of lateral instability. The hardness, height and angles of the wedge-shaped features 912 may be changed to alter the degree of instability.

Figure 17:
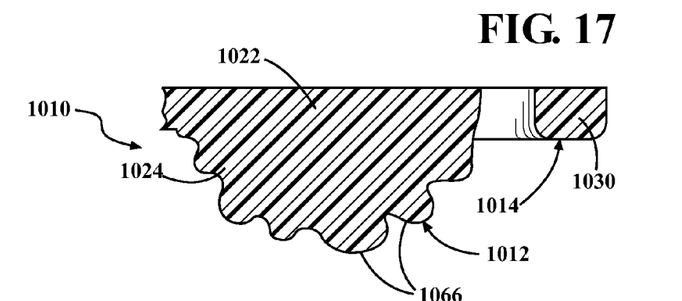
FIG. 17 is a cross-sectional and fragmentary view of a twelfth exemplary embodiment of the proprioceptive device.

Referring now to FIG. 17, an eleventh exemplary embodiment of the proprioception device 1010 is shown with like numerals, separated by a factor of 1000, being used to identify features corresponding with those of the first exemplary embodiment discussed above. In this embodiment, each of the features 1012 has a rocky shape with a plurality of rock-like protrusions 1066 extending outwardly. The rock-like protrusions may be of the same material as the base portion 1022 or of a different material. For example, the rock-like protrusions 1066 could be actual rocks. This embodiment of the proprioceptive device 1010 may be beneficial for training for rock climbing, for example.

Figure 18:
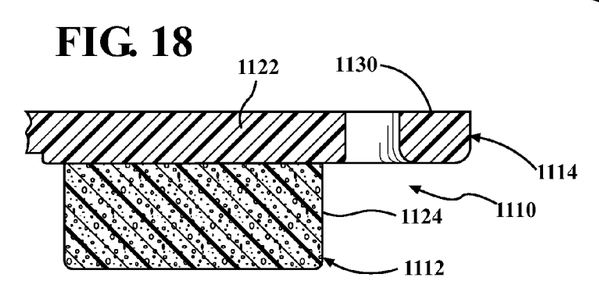
FIG. 18 is a cross-sectional and fragmentary view of a thirteenth exemplary embodiment of the proprioceptive device.

Referring now to FIG. 18, a twelfth exemplary embodiment of the proprioceptive device 1110 is shown with like numerals, separated by a factor of 1100, being used to identify features corresponding with those of the first exemplary embodiment discussed above. In this embodiment, each of the features 1112 is a foam block 1112 of material that is bonded to the base portion 1122. The foam block 1112 may have of an open or closed cell foam and may have any desirable stiffness. The exemplary foam block 1112 is generally rectangularly-shaped but could have any suitable shape.

Figure 19:
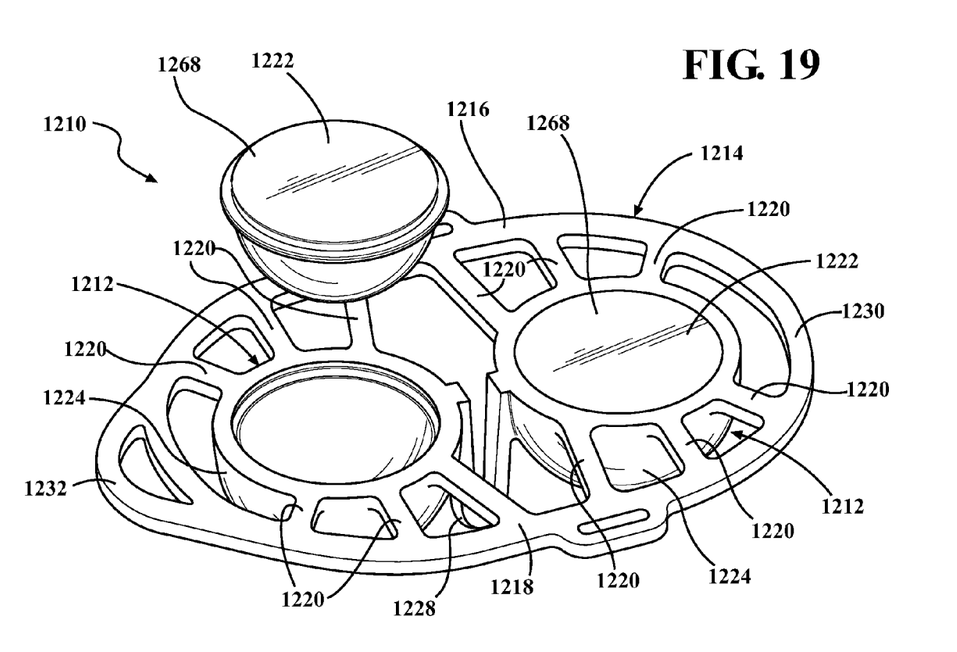
FIG. 19 is a top perspective view of a fourteenth exemplary embodiment of the proprioceptive device and showing one insert being partially separated from a lower receiving portion.

Referring now to FIG. 19, a thirteenth exemplary embodiment of the proprioceptive device 1210 is shown with like numerals, separated by a factor of 1200, being used to identify features corresponding with those of the first exemplary embodiment discussed above. In this exemplary embodiment, each of the features 1212 includes a lower shaped portion 1224 and an insert 1268. The lower shaped portions 1224 are generally cup-shaped and have open tops. The inserts 1268 are shaped similarly to the opening of the lower shaped portion 1224 and may be inserted into and removed from the lower shaped portions 1224 of the features 1268 to adjust the instability provided by the proprioceptive device 1210. The inserts 1268 may be formed of a range of materials including, for example, foam, gel, rubber, another elastomeric material, gel, sand, beads, a water pouch, an air pouch or any other suitable material or combination of materials.

The foregoing description is exemplary rather than limiting in nature. Variations and modifications to the disclosed embodiment may become apparent to those skilled in the art are herein incorporated within the scope of the invention.

What is claimed is:

1. A proprioceptive device for improving proprioceptive balance in a person, comprising:
    an elastic band which is expandable for releasably engaging about a shoe; and
    at least two vertically extending instability inducing, ground-engaging proprioception features carried by said at least one band, and wherein said at least two proprioceptive features are spaced from one another in a longitudinal direction of said device for inducing lateral and longitudinal instability while allowing the person to walk with a heel to toe gait in the longitudinal direction of the device.

2. The proprioceptive device as set forth in claim 1 wherein said at least two instability inducing proprioceptive features is further defined as only a pair of proprioception features.

3. The proprioceptive device as set forth in claim 2 wherein said proprioceptive features are interconnected with said elastic band through a plurality of struts that are formed integrally with said elastic band.

4. The proprioceptive device as set forth in claim 3 wherein said proprioceptive features are formed as one piece with said plurality of struts and said elastic band.

5. The proprioceptive device as set forth in claim 2 further including a bridge of an elastic material and interconnecting said pair of proprioceptive features and having a length that is greater than a gap between said proprioceptive features when said elastic band is in a relaxed state.

6. The proprioceptive device as set forth in claim 2 wherein each of said instability inducing proprioceptive features has a top surface and a relatively smaller bottom surface.

7. The proprioceptive device as set forth in claim 6 wherein each of said proprioceptive features is generally hemispherically shaped.

8. The proprioceptive device as set forth in claim 7 wherein each of said proprioceptive features is hollow to present and air chamber.

9. The proprioceptive device as set forth in claim 8 wherein at least one of said proprioceptive features includes an air valve for selectively inflating and deflating the associated air chamber.

10. The proprioceptive device as set forth in claim 9 further including a tubular bridge interconnecting and establishing fluid communication between said proprioception features for allowing both of said sir chambers to be simultaneously selectively inflated and deflated and to allow air to flow between said air chambers.

11. The proprioceptive device as set forth in claim 1 wherein said proprioception features includes a plurality of strands extending in generally parallel relationship with one another.

12. The proprioceptive device as set forth in claim 11 wherein said strands are of a different material from said band.

13. The proprioceptive device as set forth in claim 1 wherein said proprioceptive features are generally rectangularly shaped.

14. The proprioceptive device as set forth in claim 1 wherein said proprioceptive features include a plurality of irregularities extending in differing directions and extending to different heights.

15. The proprioceptive device as set forth in claim 1 wherein said proprioceptive features are of an artificial turf material.

16. The proprioceptive device as set forth in claim 1 wherein said proprioceptive features are of foam.

17. A method of improving stability in a person with, comprising:
    preparing a pair of proprioceptive devices, each proprioceptive device including an elastic band and at least two instability inducing proprioception features spaced in a longitudinal direction from one another and carried by said band;
    expanding the elastic band of one proprioceptive device and contracting it around a shoe and expanding the elastic band of the other proprioceptive device and contracting it around another shoe; and
    walking with a heel to toe nit while the proprioception features on the proprioception devices induce instability in a lateral and longitudinal direction.

* * * * *